(12) United States Patent
Homsy, II

(10) Patent No.: US 9,621,003 B2
(45) Date of Patent: Apr. 11, 2017

(54) WINDING TECHNIQUE FOR MINIMIZING VOLTAGE STRESS IN A MOTOR

(71) Applicant: X Development LLC, Mountain View, CA (US)

(72) Inventor: George E. Homsy, II, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 369 days.

(21) Appl. No.: 14/143,691

(22) Filed: Dec. 30, 2013

(65) Prior Publication Data

US 2015/0188374 A1    Jul. 2, 2015

(51) Int. Cl.
*H02K 3/28* (2006.01)
*H02K 15/085* (2006.01)
(Continued)

(52) U.S. Cl.
CPC .............. *H02K 3/28* (2013.01); *H02K 15/095* (2013.01); *H02K 3/52* (2013.01); *H02K 3/521* (2013.01);
(Continued)

(58) Field of Classification Search
CPC .. H02K 15/095; H02K 15/0435; H02K 15/08; H02K 3/28; H02K 3/00; H02K 3/46;
(Continued)

(56) References Cited

U.S. PATENT DOCUMENTS 4,847,982 A    7/1989  Morrill
7,152,301 B2   12/2006 Rittmeyer
(Continued)

FOREIGN PATENT DOCUMENTS

DE  102011084716  4/2013
WO  2013/080377   6/2013

OTHER PUBLICATIONS

International Search Report dated Mar. 10, 2015, for corresponding PCT application No. PCT/US2014/069732.

*Primary Examiner* — Michael Andrews
*Assistant Examiner* — Alexander Moraza
(74) *Attorney, Agent, or Firm* — McDonnell Boehnen Hulbert & Berghoff LLP

(57) ABSTRACT

A method may involve winding a stator of a motor having m phases, wherein the stator includes n teeth. The method may include winding a wire around a first tooth of the stator and winding the wire around a second tooth of the stator, wherein the second tooth is $$\left(\frac{n}{2m}-1\right)$$

teeth from the first tooth. The method may also include winding the wire around a third tooth of the stator, wherein the third tooth is $$\left[(m-1)*\left(\frac{n}{2m}\right)\right]+1$$

teeth from the second tooth. The method may also include winding the wire around a fourth tooth of the stator, wherein the fourth tooth is $$\left(\frac{n}{2m}-1\right)$$

(Continued)

teeth from the third tooth. The method may also include winding the wire around a fifth tooth of the stator, wherein the fifth tooth is $$\left[(m-1)*\left(\frac{n}{2m}\right)\right]+2$$

teeth from the fourth tooth.

20 Claims, 11 Drawing Sheets

(51) Int. Cl.
    *H02K 15/095*     (2006.01)
    *H02K 3/46*     (2006.01)
    *H02K 3/52*     (2006.01)
    *H02K 15/08*     (2006.01)

(52) U.S. Cl.
    CPC .......... *H02K 15/08* (2013.01); *H02K 15/085* (2013.01); *H02K 2213/03* (2013.01); *Y10T 29/49009* (2015.01); *Y10T 29/49071* (2015.01)

(58) Field of Classification Search
    CPC ...... H02K 3/521; H02K 3/52; H02K 2213/03; H02K 15/02; H02K 3/40; H02K 15/085; Y10T 29/49009; Y10T 29/49071
    USPC ....... 310/179, 180, 184, 198, 208, 195, 196; 29/596, 605
    See application file for complete search history.

(56) References Cited

U.S. PATENT DOCUMENTS

| | | | |
|---|---|---|---|
| 8,441,164 B2 | 5/2013 | Takahashi et al. | |
| 2002/0130578 A1 | 9/2002 | Anma | |
| 2004/0183388 A1 | 9/2004 | Rittmeyer | |
| 2006/0022544 A1* | 2/2006 | Kinashi ................ | H02K 21/16 310/179 |
| 2006/0220486 A1* | 10/2006 | Miyashita .............. | H02K 3/28 310/179 |
| 2008/0211338 A1* | 9/2008 | Koka .................... | H02K 21/22 310/198 |
| 2009/0184601 A1* | 7/2009 | Dubus .................... | H02K 3/28 310/208 |
| 2012/0274172 A1 | 11/2012 | Koga | |
| 2013/0214630 A1* | 8/2013 | Ombach ................ | H02K 3/28 310/152 |

* cited by examiner

PRIOR ART

WINDING TECHNIQUE FOR MINIMIZING VOLTAGE STRESS IN A MOTOR

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Methods and systems for winding an electric motor to reduce voltage stress are described herein. Such an electric motor may include a rotor and a stator. The stator is the stationary component that may include a plurality of teeth around which one or more winding wires may be wound. The winding wire is wound such that when a current passes through the winding wire, a rotating magnetic field is created, causing the rotor to rotate. In an example arrangement, the electric motor may be a medium to high voltage motor. In such a scenario, several thousand volts may be applied to the coils, which may result in an electric arc between the coil and other components of the electric motor. One technique to address this problem is to add thicker insulation between the coils, and between the coils and the stator material. However, adding insulation may make the motor more difficult to cool, resulting in lower performance. Beneficially, embodiments described herein may reduce the maximum voltage difference, or "voltage stress," between adjacent coils by winding the coils in a particular configuration. The reduced maximum voltage difference may decrease the potential for electrical arcing between components of the electric motor.

In one aspect, a method for winding a stator of a motor is described. The stator may include n teeth, and the motor may have m phases. The method may include winding a wire around a first tooth of the stator. The method may also include winding the wire around a second tooth of the stator such that a first portion of the wire extends from the first tooth to the second tooth, wherein the second tooth is $$\left(\frac{n}{2m} - 1\right)$$

teeth from the first tooth. The method may also include winding the wire around a third tooth of the stator such that a second portion of the wire extends from the second tooth to the third tooth, wherein the third tooth is $$\left[(m-1) * \left(\frac{n}{2m}\right)\right] + 1$$

teeth from the second tooth. The method may also include winding the wire around a fourth tooth of the stator such that a third portion of the wire extends from the third tooth to the fourth tooth, wherein the fourth tooth is $$\left(\frac{n}{2m} - 1\right)$$

teeth from the third tooth. The method may also include winding the wire around a fifth tooth of the stator such that a fourth portion of the wire extends from the fourth tooth to the fifth tooth, wherein the fifth tooth is $$\left[(m-1) * \left(\frac{n}{2m}\right)\right] + 2$$

teeth from the fourth tooth.

In another aspect, a motor having m phases may include a rotor and a stator defining n teeth. The motor may also include a wire a wire wound around a first tooth of the stator to create a first coil. The motor may also include a second coil wound around a second tooth of the stator such that a first portion of the wire extends from the first tooth to the second tooth, wherein the second tooth is $$\left(\frac{n}{2m} - 1\right)$$

teeth from the first tooth. The motor may also include a third coil wound around a third tooth of the stator such that a second portion of the wire extends from the second tooth to the third tooth, wherein the third tooth is $$\left[(m-1) * \left(\frac{n}{2m}\right)\right] + 1$$

teeth from the second tooth. The motor may also include a fourth coil wound around a fourth tooth of the stator such that a third portion of the wire extends from the third tooth to the fourth tooth, wherein the fourth tooth is $$\left(\frac{n}{2m} - 1\right)$$

teeth from the third tooth. The motor may also include a fifth coil wound around a fifth tooth of the stator such that a fourth portion of the wire extends from the fourth tooth to the fifth tooth, wherein the fifth tooth is $$\left[(m-1) * \left(\frac{n}{2m}\right)\right] + 2$$

teeth from the fourth tooth.

In another aspect, another method for winding a stator of a motor is described. The stator may include n teeth, and the motor may have m phases. The method may include winding a first winding wire around a first set of teeth of the stator to create a first set of coils, wherein a first voltage ($V_1$) is applied to the first winding wire such that the first voltage is applied to the first set of coils, and wherein the first winding wire is wound around the first set of teeth such that a voltage difference between adjacent coils does not exceed $$\frac{5*V_1}{(n/m)}.$$

The method may also include winding a second winding wire around a second set of teeth of the stator to create a second set of coils, wherein a second voltage is applied to the second winding wire such that the second voltage is applied to the second set of coils, and wherein the second winding wire is wound around the second set of teeth such that a voltage difference between adjacent coils does not exceed $$\frac{5*V_1}{(n/m)}.$$

The method may also include winding a third winding wire around a third set of teeth of the stator to create a third set of coils, wherein a third voltage is applied to the third winding wire such that the third voltage is applied to the third set of coils, and wherein the third winding wire is wound around the third set of teeth such that a voltage difference between adjacent coils does not exceed $$\frac{5*V_1}{(n/m)}.$$

In yet another aspect, a system may include means for winding a stator of a motor, where the stator includes n teeth and the motor has m phases. The system may include a means for winding a wire around a first tooth of the stator. The system may also include a means for winding the wire around a second tooth of the stator such that a first portion of the wire extends from the first tooth to the second tooth, wherein the second tooth is $$\left(\frac{n}{2m} - 1\right)$$

teeth from the first tooth. The system may also include a means for winding the wire around a third tooth of the stator such that a second portion of the wire extends from the second tooth to the third tooth, wherein the third tooth is $$\left[(m-1)*\left(\frac{n}{2m}\right)\right] + 1$$

teeth from the second tooth. The system may also include a means for winding the wire around a fourth tooth of the stator such that a third portion of the wire extends from the third tooth to the fourth tooth, wherein the fourth tooth is $$\left(\frac{n}{2m} - 1\right)$$

teeth from the third tooth. The system may also include a means for winding the wire around a fifth tooth of the stator such that a fourth portion of the wire extends from the fourth tooth to the fifth tooth, wherein the fifth tooth is $$\left[(m-1)*\left(\frac{n}{2m}\right)\right] + 2$$

teeth from the fourth tooth.

These as well as other aspects, advantages, and alternatives, will become apparent to those of ordinary skill in the art by reading the following detailed description, with reference where appropriate to the accompanying drawings.

DETAILED DESCRIPTION

Figure 1:
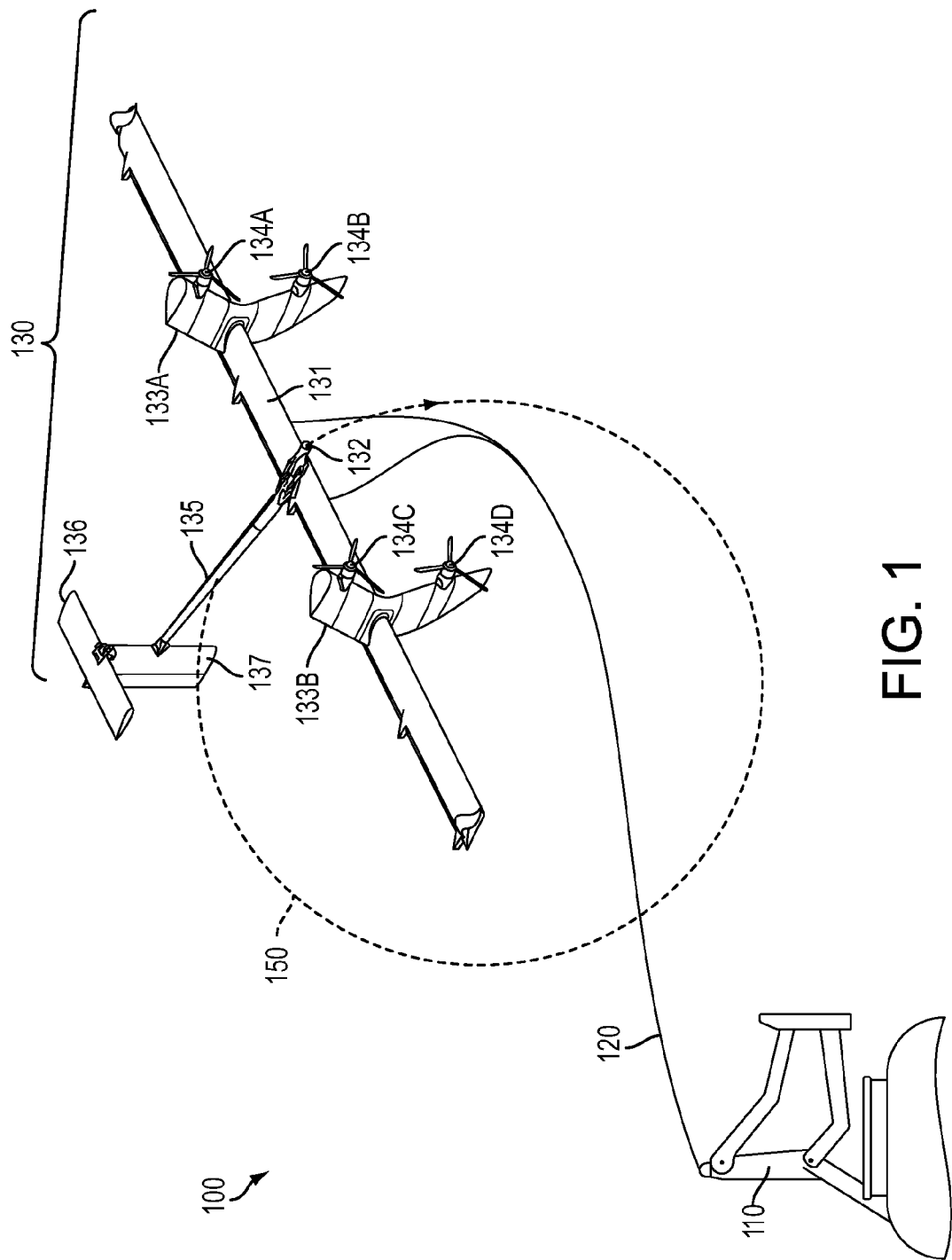
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Illustrative embodiments relate to aerial vehicles, which may be used in a wind energy system, such as an Airborne Wind Turbine (AWT). In particular, illustrative embodiments may relate to or take the form of methods and systems for winding an electric motor to reduce voltage stress between adjacent coils in an electric motor, which is utilized by an aerial vehicle that is part of an AWT. Note, however, that example embodiments are not limited to implementation in an AWT, and may be implemented in other scenarios where an electric motor is utilized.

By way of background, an AWT may include an aerial vehicle that flies in a path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. In some implementations, the ground station may transmit electricity to the aerial vehicle for take-off and/or landing.

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

An example aerial vehicle may include one or more motors configured to drive one or more generators for the purpose of generating electrical energy. The one or more motors may each be coupled to one or more blades, such as three blades as an example. The one or more motor blades may rotate via interactions with the wind and which could be used to drive the one or more generators. In addition, the one or more motors may also be configured to provide a thrust to the aerial vehicle during flight. With this arrangement, the one or more motors may function as one or more propulsion units, such as a propeller.

The one or more motors discussed above may be an electric motor. Such a motor may include a rotor, and a stator. The stator is a stationary component that may include a plurality of teeth around which one or more winding wires may be wound. The winding wires are wound such that when a current passes through the winding wires, a rotating magnetic field is created. The rotor is a rotating component which may include a group of permanent magnets arranged around a cylinder with the poles facing the stator poles. The rotor is located inside of the stator, and as current passes through the winding wire, the rotor is configured to rotate.

In an example arrangement, the electric motor may be a medium to high voltage motor. In such a scenario, several thousand volts may be applied to the coils wound around the stator teeth, which may result in an electric arc between such coils and other components of the electric motor. One solution to this problem is to add insulation between components of the motor. However, adding insulation may make the motor more difficult to cool, resulting in heat loss. Therefore, a method for reducing the potential for electrical arcing between components of the electric motor may be desirable.

In one example, a method is provided for winding a stator of a motor to reduce the maximum voltage difference between adjacent coils. The stator may include n teeth, and the motor may have m phases. The method may include winding a wire around a first tooth of the stator. The method may then include winding the wire around a second tooth of the stator such that a first portion of the wire extends from the first tooth to the second tooth. The second tooth is located $$\left(\frac{n}{2m} - 1\right)$$

teeth from the first tooth. The method may then include winding the wire around a third tooth of the stator such that a second portion of the wire extends from the second tooth to the third tooth. The third tooth is located $$\left[(m-1) * \left(\frac{n}{2m}\right)\right] + 1$$

teeth from the second tooth. The method may then include winding the wire around a fourth tooth of the stator such that a third portion of the wire extends from the third tooth to the fourth tooth. The fourth tooth is located $$\left(\frac{n}{2m} - 1\right)$$

teeth from the third tooth. The method may then include winding the wire around a fifth tooth of the stator such that a fourth portion of the wire extends from the fourth tooth to the fifth tooth. The fifth tooth is located $$\left[(m-1) * \left(\frac{n}{2m}\right)\right] + 2$$

teeth from the fourth tooth.

Additional stator teeth may be wound by the wire. The wire wound around the first, second, third, fourth and fifth teeth may represent a first phase of a plurality of phases of the motor. Additional phases may be wound around additional teeth of the stator using the same winding pattern described above.

The wire wound around the stator teeth creates a set of coils. A voltage (V) may be applied to the wire such that the voltage is applied to the set of coils. In one example, the wire may be would around the stator teeth such that a voltage difference between adjacent coils does not exceed $$\frac{5 * V}{(n/m)}.$$

It should be understood that the above examples are provided for illustrative purposes, and should not be construed as limiting. As such, the method may additionally or alternatively includes other features or includes fewer features, without departing from the scope of the invention.

II. ILLUSTRATIVE SYSTEMS

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight. In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of a AWT

Figure 2:
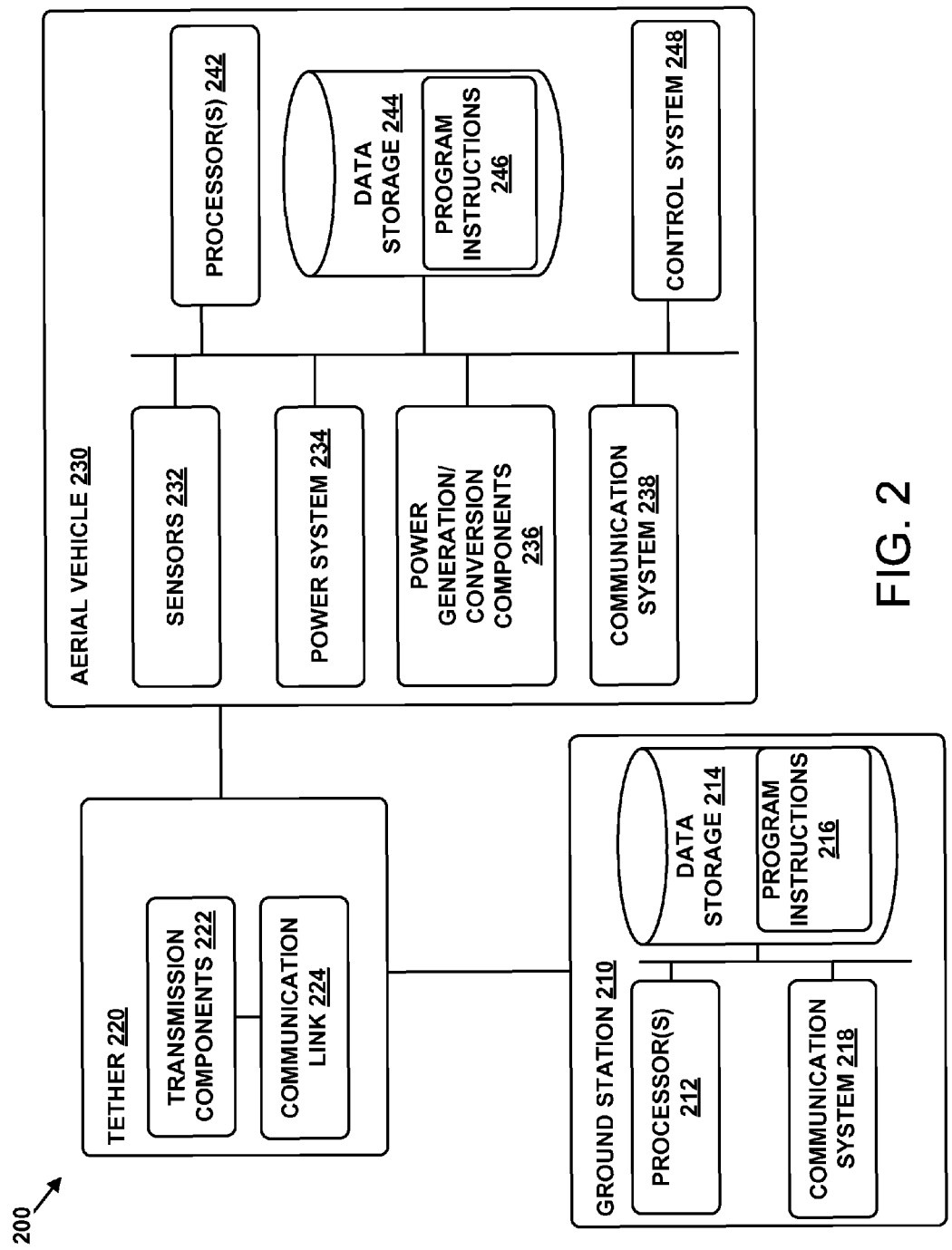
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

III. ILLUSTRATIVE METHODS

As discussed above, an example aerial vehicle may include one or more motors configured to drive one or more generators for the purpose of generating electrical energy. In one example, the one or more motors may be an electric motor. Such a motor may include a rotor, and a stator. The stator is a stationary component that may include a plurality of teeth around which a winding wire may be wound. The winding wire may be wound such that when a current passes through the winding wire, a rotating magnetic field is created. The rotor is a rotating component which may include a group of permanent magnets arranged around a cylinder with the poles facing the stator poles. The rotor may be located inside of the stator, and as current passes through the winding wire, the rotor may be configured to rotate.

Figure 3A:
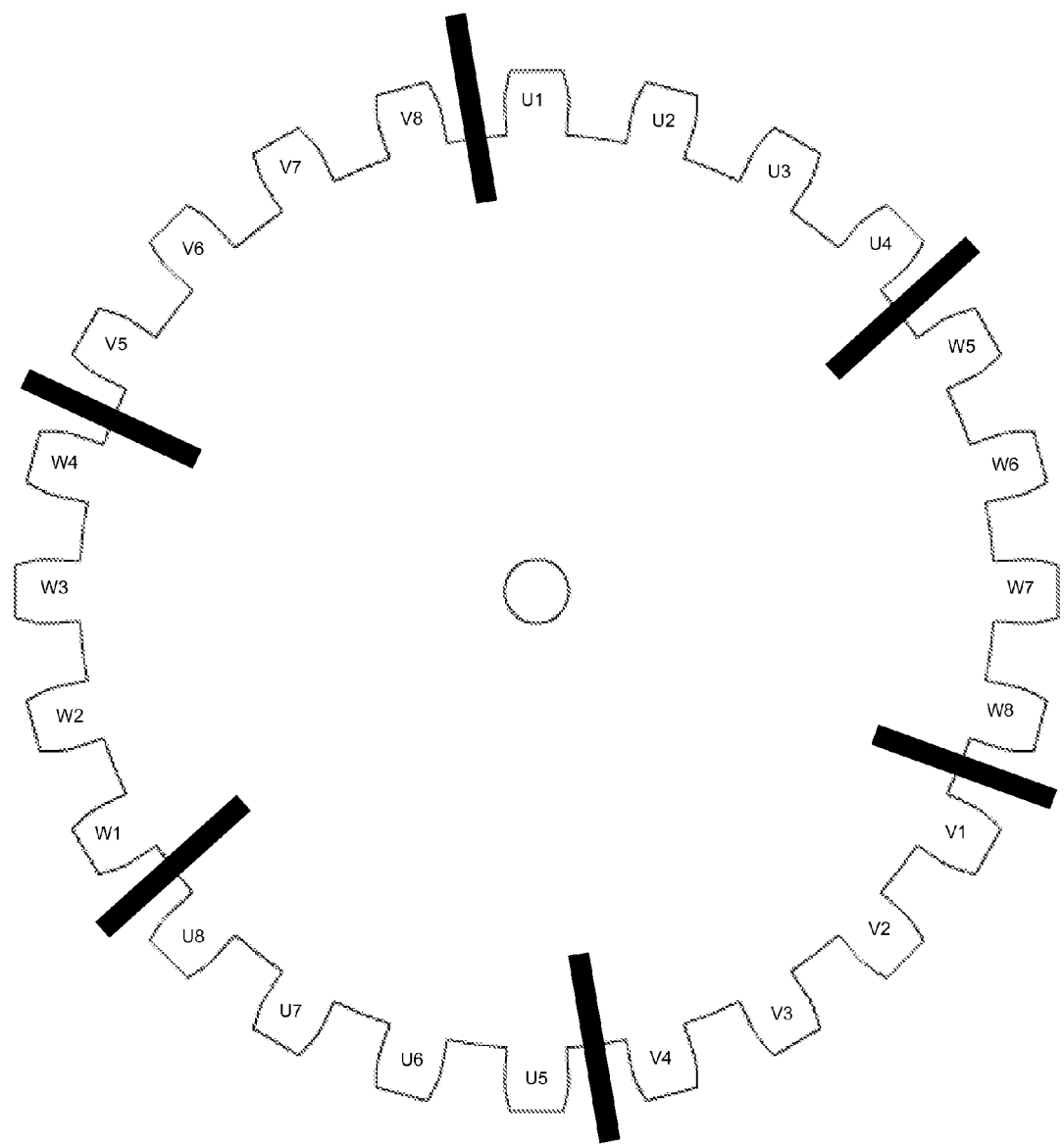
FIG. 3A illustrates a mechanical representation of a traditional winding pattern for stator teeth of a three-phase motor.

FIG. 3A illustrates a mechanical representation of a traditional winding pattern for a 24-tooth stator of a three-phase electric motor. For phase U, a winding wire is wound around teeth U1, U2, U3, U4 (in that order), and then across the stator to teeth U5, U6, U7, and finally U8. The same winding pattern is performed for phase V and phase W. In an example arrangement, the electric motor may be a medium to high voltage motor. In such a scenario, several thousand volts may be applied to the coils wound around the stator teeth. The solid black lines shown in FIG. 3A indicate areas where coils are mechanically close to one another, but electrically far apart (i.e., there is a large maximum voltage difference between those coils). These areas may create an increased potential for electrical arcing and burning out of the motor.

Figure 3B:
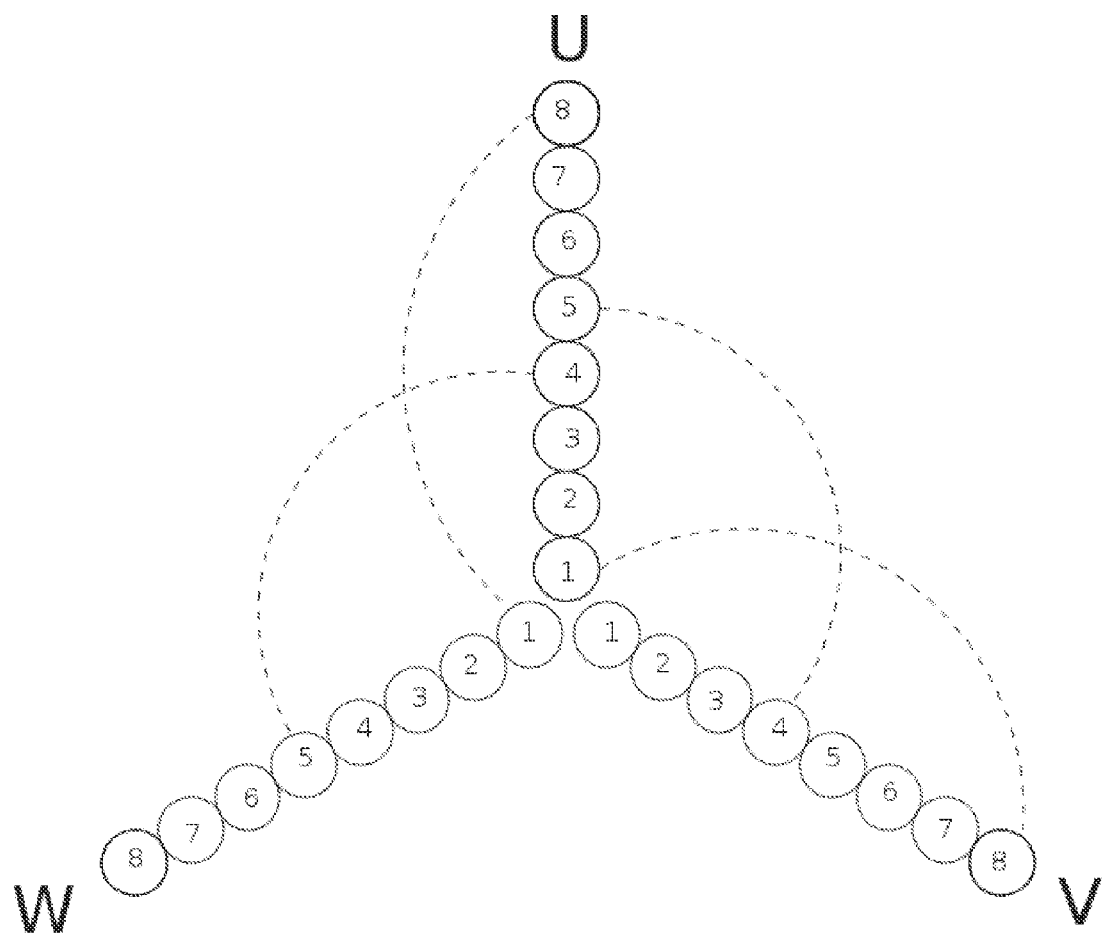
FIG. 3B illustrates an electrical representation of a traditional winding pattern for stator teeth of a three-phase motor.

FIG. 3B illustrates an electrical representation of the traditional winding pattern of FIG. 1. The dotted lines represent mechanical adjacencies between coils that are not electrically adjacent, hence locations at which large maximum voltage differences may be present. As shown in FIG. 3B, there are four locations where there is a large maximum voltage difference between adjacent coils wound via the traditional winding pattern. As an example, a voltage of 800V may be applied to the series combination of U8, U7, U6, U5, U4, U3, U2, and U1, resulting in a drop of 100V across each individual coil. Similarly, a voltage of −800V may be applied to may be applied to the series combination of W8, W7, W6, W5, W4, W3, W2, and W1, resulting in a drop of −100V across each individual coil. As shown in FIG. 3A, coils U8 and W1 are mechanically adjacent to one another, and the maximum voltage difference between these coils is 900V. The same 900V maximum voltage difference exists between coils U5 and V4, U4 and W5 and U1 and V8. As discussed above, these areas may have an increased potential for electrical arcing between components of the electric motor.

One solution to this problem is to add insulation between components of the motor. However, adding insulation may make the motor more difficult to cool, resulting in lower overall performance of the motor. Further, adding insulation takes up space inside of the motor that could otherwise be used to increase the number of coils around each stator tooth. Therefore, an improved winding pattern for reducing the potential for electrical arcing between components of the electric motor may be desirable.

Figure 4:
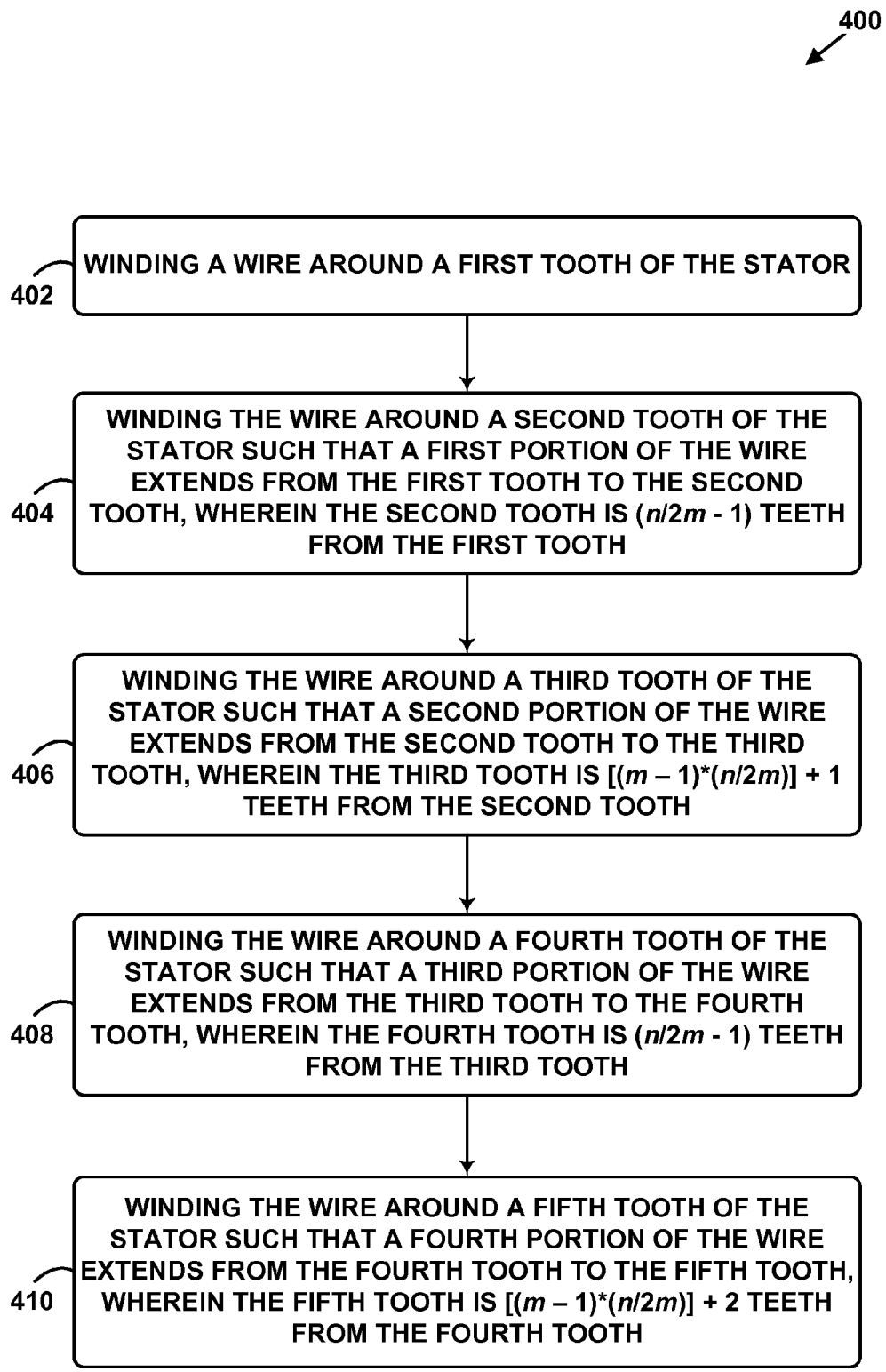
FIG. 4 is a flowchart of a method, according to an example embodiment.

FIG. 4 is a flowchart illustrating a method 400, according to an example embodiment. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Method 400 describes a method for winding a stator of a motor, wherein the stator has n teeth, and wherein the motor has m phases. In particular, at block 402, method 400 involves winding a wire around a first tooth of the stator. In one example, the wire may be an insulated copper wire. In another example, the wire may be an insulated aluminum wire. Other types of wire are possible as well.

Figure 5A:
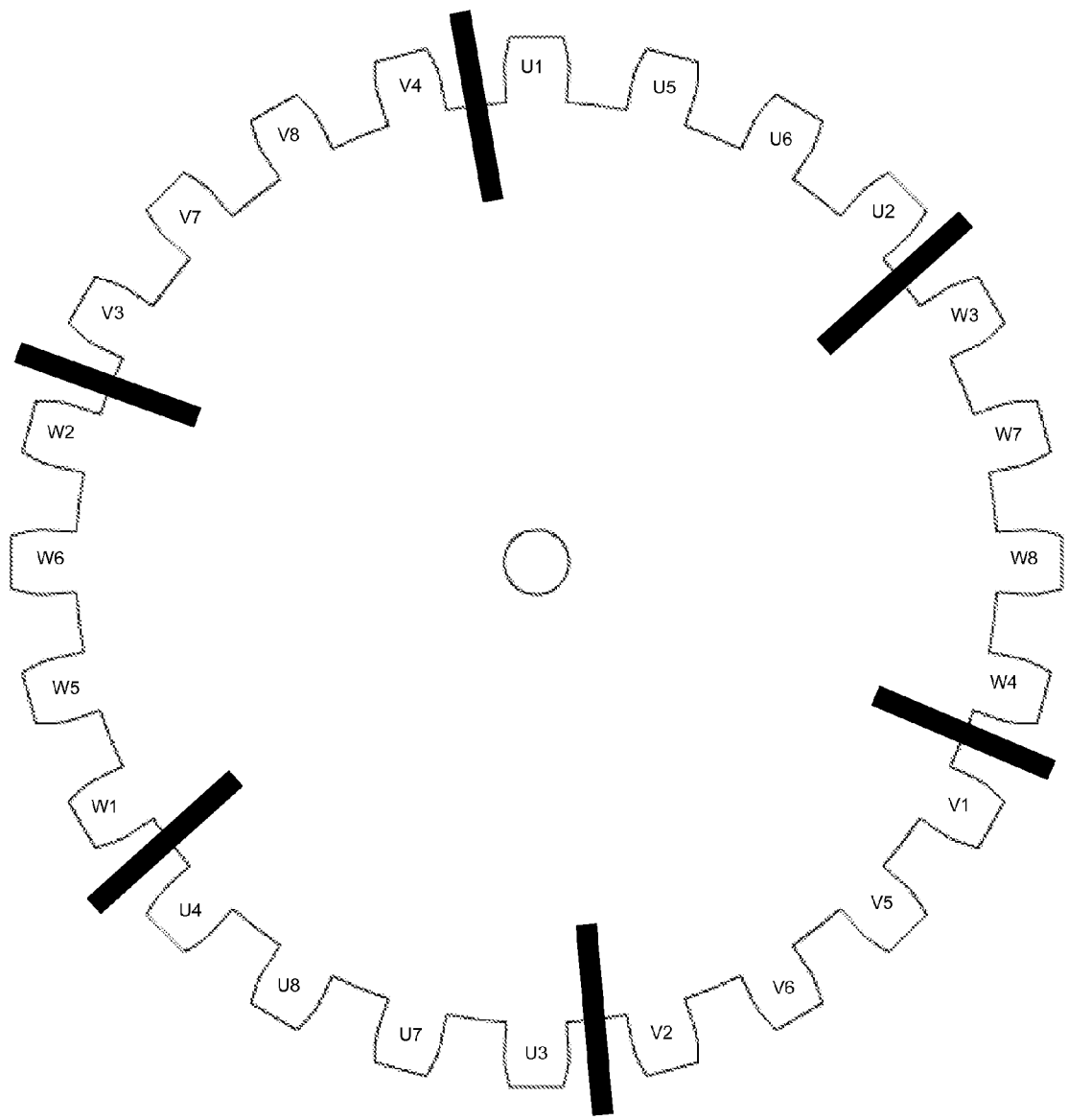
FIG. 5A illustrates a mechanical representation of a winding pattern for stator teeth of a three-phase motor, according to an example embodiment.

At block 404, method 400 involves winding the wire around a second tooth of the stator such that a first portion of the wire extends from the first tooth to the second tooth. The second tooth is located $$\left(\frac{n}{2m} - 1\right)$$

teeth from the first tooth. As a specific example, FIG. 5A illustrates a 24-tooth stator for a three-phase motor. In this example, n=24 and m=3. Therefore, the second tooth is located $$\left(\frac{24}{2*3} - 1\right) = 3$$

teeth from the first tooth. In the example shown in FIG. 5A, the second tooth is three teeth clockwise from the first tooth. In another example, the second tooth may be located three teeth counterclockwise from the first tooth.

At block 406, method 400 involves winding the wire around a third tooth of the stator such that a second portion of the wire extends from the second tooth to the third tooth. The third tooth is located $$\left[(m-1)*\left(\frac{n}{2m}\right)\right] + 1$$

teeth from the second tooth. Continuing with the example winding pattern of FIG. 5A, the third tooth is located $$\left[(3-1)*\left(\frac{24}{2*3}\right)\right] + 1 = 9$$

teeth from the second tooth. Since the second tooth is located three teeth clockwise from the first tooth, the third tooth must be located nine teeth clockwise from the second tooth. However, if the second tooth was positioned three teeth counterclockwise from the first tooth, the third tooth would be located nine teeth counterclockwise from the second tooth.

At block 408, method 400 involves winding the wire around a fourth tooth of the stator such that a third portion of the wire extends from the third tooth to the fourth tooth. The fourth tooth is located $$\left(\frac{n}{2m} - 1\right)$$

teeth from the third tooth. Continuing with the example winding pattern of FIG. 5A, the third tooth is located $$\left(\frac{24}{2*3} - 1\right) = 3$$

teeth from the third tooth. As discussed above, since the second tooth is located three teeth clockwise from the first tooth, the fourth tooth must be located three teeth clockwise from the third tooth. However, if the second tooth was positioned three teeth counterclockwise from the first tooth, the fourth tooth would be located three teeth counterclockwise from the third tooth.

At block 410, method 400 involves winding the wire around a fifth tooth of the stator such that a fourth portion of the wire extends from the fourth tooth to the fifth tooth. The fifth tooth is located $$\left[(m-1)*\left(\frac{n}{2m}\right)\right]+2$$

teeth from the fourth tooth. Continuing with the example winding pattern of FIG. 5A, the third tooth is located $$\left[(3-1)*\left(\frac{24}{2*3}\right)\right]+2=10$$

teeth from the fourth tooth. As discussed above, since the second tooth is located three teeth clockwise from the first tooth, the fifth tooth must be located ten teeth clockwise from the fourth tooth. However, if the second tooth was positioned three teeth counterclockwise from the first tooth, the fifth tooth would be located ten teeth counterclockwise from the fourth tooth.

FIG. 5A illustrates a mechanical representation of a winding pattern for a 24-tooth stator of a three-phase motor, according to an example embodiment. In such an example, the method 400 may continue with winding the wire around a sixth tooth of the stator such that a fifth portion of the wire extends from the fifth tooth to the sixth tooth, where the sixth tooth is located one tooth from the fifth tooth. The method 400 may then include winding the wire around a seventh tooth of the stator such that a sixth portion of the wire extends from the sixth tooth to the seventh tooth, where the seventh tooth is located eleven teeth from the sixth tooth. Finally, the method 400 may include winding the wire around an eighth tooth of the stator such that a seventh portion of the wire extends from the seventh tooth to the eighth tooth, where the eighth tooth is located one tooth from the seventh tooth. The solid black lines shown in FIG. 5A indicate areas with the highest maximum voltage difference between adjacent coils.

The wire wound around the first, second, third, fourth, fifth, sixth, seventh, and eighth teeth are represented in FIG. 5A as teeth U1-U8, respectively. The wire wound around teeth U1-U8 may represent a first phase of a three-phase motor. A second phase may be represented by teeth W1-W8, and a third phase may be represented by teeth V1-V8. The second and third phases may be wound using the same winding pattern described by method 400 above.

Figure 5B:
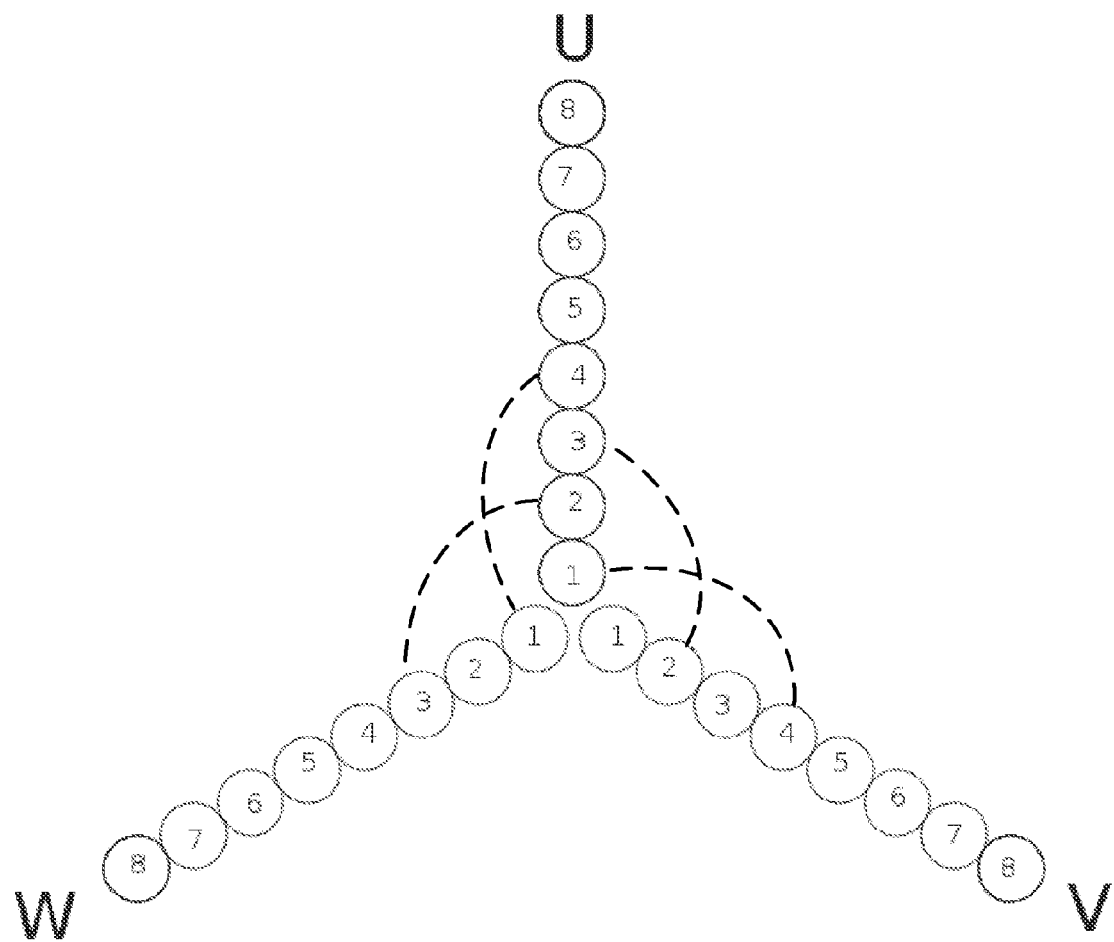
FIG. 5B illustrates an electrical representation of a winding pattern for stator teeth of a three-phase motor, according to an example embodiment.

FIG. 5B illustrates an electrical representation of the winding pattern of FIG. 5A, according to an example embodiment. The dotted lines represent mechanical adjacencies between coils that are not electrically adjacent, hence locations at which large maximum voltage differences may be present. As shown in FIG. 5B, the maximum voltage difference is significantly less than that of the traditional winding pattern shown in FIG. 3B. Using the example above, a voltage of 800V may be applied to the series combination of U8, U7, U6, U5, U4, U3, U2, and U1, resulting in a drop of 100V across each individual coil. Similarly, a voltage of −800V may be applied to may be applied to the series combination of W8, W7, W6, W5, W4, W3, W2, and W1, resulting in a drop of −100V across each individual coil. The maximum voltage difference between U4 and W1 may be as large as 500V. Similarly, the maximum voltage difference between U3 and V2, U2 and W3, and U1 and V4 is 500V. As discussed above in relation to FIGS. 3A-3B, in the traditional winding pattern the maximum voltage difference was 900V. In medium to high voltage electric motors where hundreds or thousands of volts are passing through the coils, a reduction in the maximum voltage difference between adjacent coils may prevent arcing from occurring.

Figure 5C:
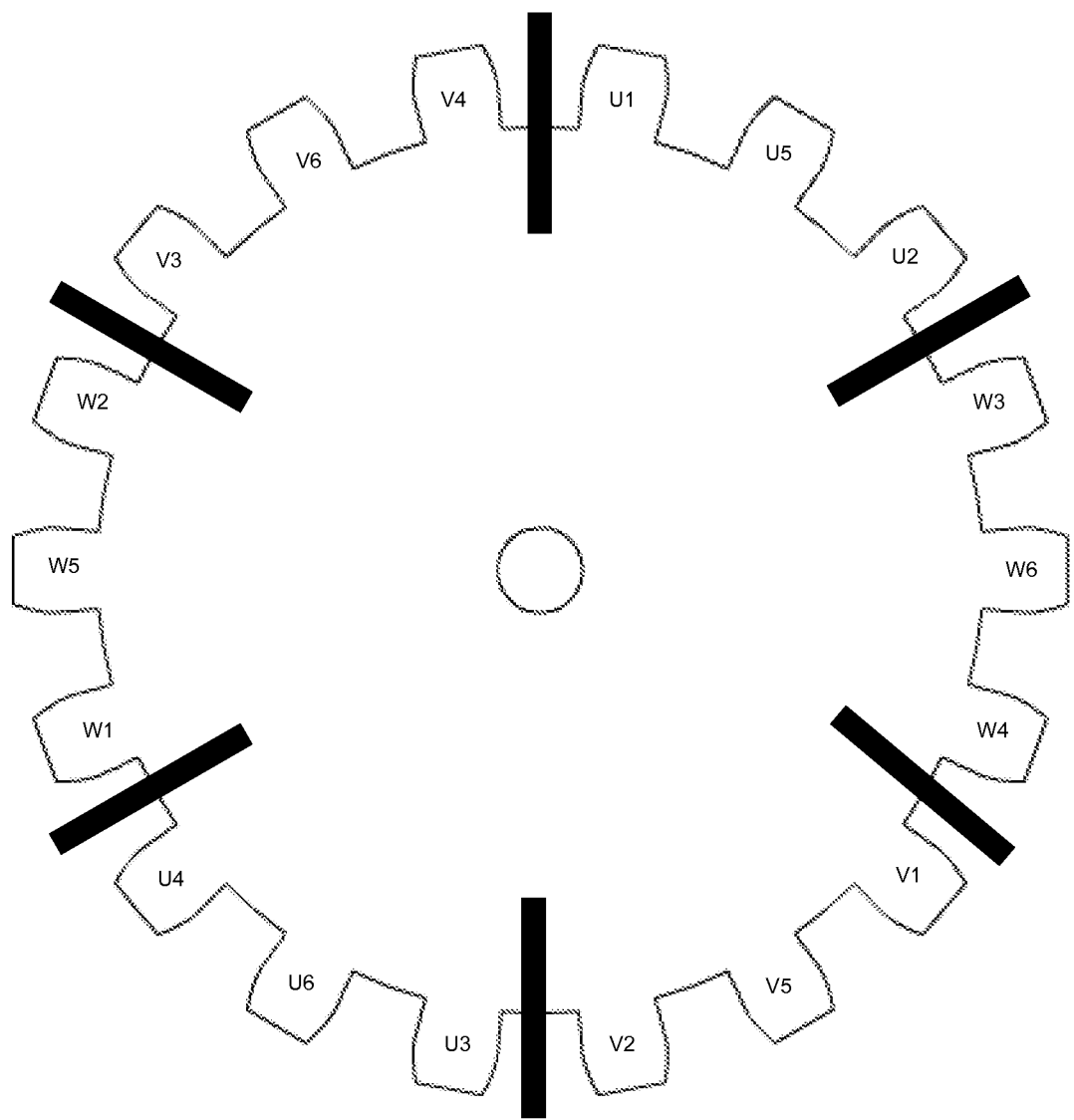
FIGS. 5C-5D illustrate mechanical representations of winding patterns for stator teeth of various three-phase motors, according to an example embodiment.

FIG. 5C illustrates a mechanical representation of a winding pattern for a 18-tooth stator of a three-phase motor, according to an example embodiment. In such an example, the method 400 may continue with winding the wire around a sixth tooth of the stator such that a fifth portion of the wire extends from the fifth tooth to the sixth tooth, wherein the sixth tooth is nine teeth from the fifth tooth. The solid black lines shown in FIG. 5C indicate areas with the highest maximum voltage difference between adjacent coils. The wire wound around the first, second, third, fourth, fifth, and sixth teeth are represented in FIG. 5C as teeth U1-U6, respectively. The wire wound around teeth U1-U6 may represent a first phase of a three-phase motor. A second phase may be represented by teeth W1-W6, and a third phase may be represented by teeth V1-V6. The second and third phases may be wound using the same winding pattern described by method 400 above.

Figure 5D:
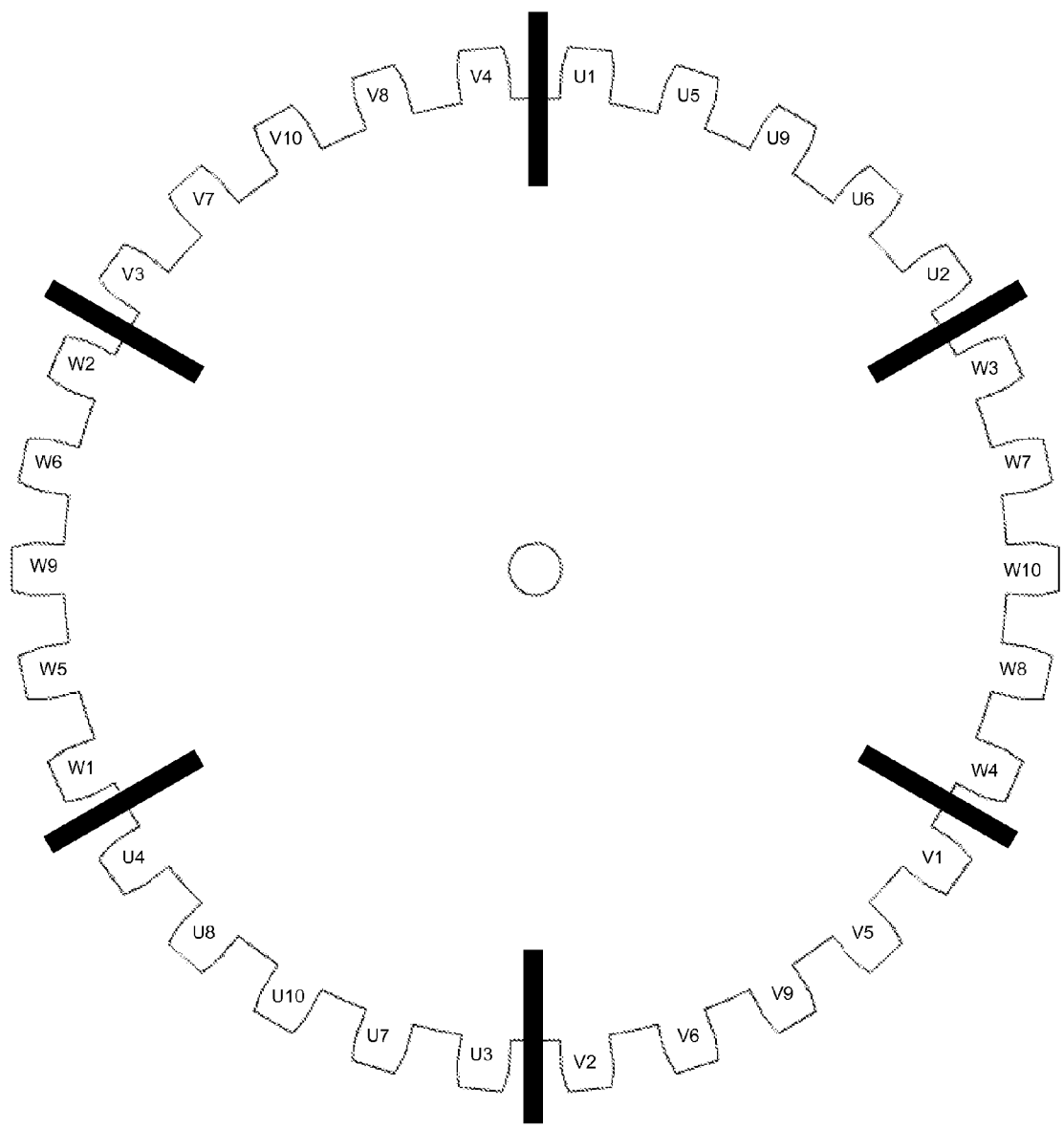

FIG. 5D illustrates a mechanical representation of a winding pattern for a 30-tooth stator of a three-phase motor, according to an example embodiment. In such an example, the method 400 may continue with winding the wire around a sixth tooth of the stator such that a fifth portion of the wire extends from the fifth tooth to the sixth tooth, where the sixth tooth is located two teeth from the fifth tooth. The method 400 may then include winding the wire around a seventh tooth of the stator such that a sixth portion of the wire extends from the sixth tooth to the seventh tooth, where the seventh tooth is located thirteen teeth from the sixth tooth. The method 400 may then include winding the wire around an eighth tooth of the stator such that a seventh portion of the wire extends from the seventh tooth to the eighth tooth, where the eighth tooth is located two teeth from the seventh tooth. The method 400 may then include winding the wire around a ninth tooth of the stator such that an eighth portion of the wire extends from the eighth tooth to the ninth tooth, where the ninth tooth is located fourteen teeth from the eighth tooth. The method 400 may then include winding the wire around a tenth tooth of the stator such that a ninth portion of the wire extends from the ninth tooth to the tenth tooth, where the tenth tooth is located fifteen teeth from the ninth tooth.

The solid black lines shown in FIG. 5D indicate areas with the highest maximum voltage difference between adjacent coils. The wire wound around the first, second, third, fourth, fifth, sixth, seventh, eighth, ninth, and tenth teeth are represented in FIG. 5D as teeth U1-U10, respectively. The wire wound around teeth U1-U10 may represent a first phase of a three-phase motor. A second phase may be represented by teeth W1-W10, and a third phase may be represented by teeth V1-V10. The second and third phases may be wound using the same winding pattern described by method 400 above.

Figure 5E:
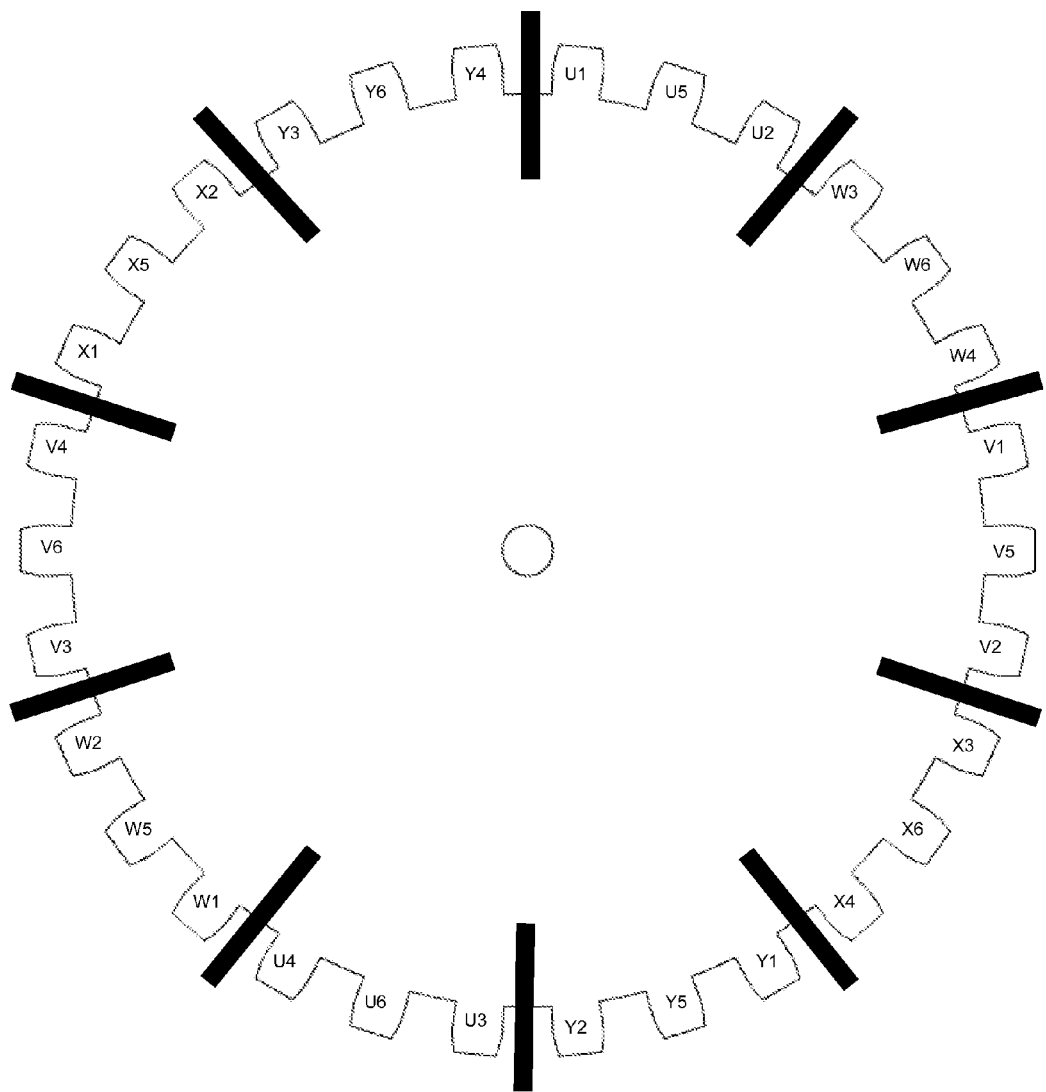
FIG. 5E illustrates a mechanical representation of a winding pattern for stator teeth of a five-phase motor, according to an example embodiment.

FIG. 5E illustrates a mechanical representation of a winding pattern for a 30-tooth stator of a five-phase motor, according to an example embodiment. Using method 400, a first tooth is wound using a wire. Next, a second tooth is wound $$\left(\frac{n}{2m} - 1\right)$$

teeth from the first tooth. Using FIG. 5E, n=30 and m=5. Therefore, the second tooth is located $$\left(\frac{30}{2*5} - 1\right) = 2$$

teeth from the first tooth. In the example shown in FIG. 5E, the second tooth is two teeth clockwise from the first tooth. In another example, the second tooth may be located three teeth counterclockwise from the first tooth.

Next, a third tooth is wound $$\left[(m-1) * \left(\frac{n}{2m}\right)\right] + 1$$

teeth from the second tooth. In FIG. 5E, the third tooth is located $$\left[(5-1) * \left(\frac{30}{2*5}\right)\right] + 1 = 13$$

teeth from the second tooth. A fourth tooth is then wound $$\left(\frac{n}{2m} - 1\right)$$

teeth from the third tooth. Thus, the fourth tooth is located $$\left(\frac{30}{2*5} - 1\right) = 2$$

teeth from the third tooth. Next, a fifth tooth is wound teeth from $$\left[(m-1) * \left(\frac{n}{2m}\right)\right] + 2$$

the fourth tooth. Thus, the fifth tooth is located $$\left[(5-1) * \left(\frac{30}{2*5}\right)\right] + 2 = 14$$

teeth from the fourth tooth. Method 400 may continue with winding the wire around a sixth tooth of the stator such that a fifth portion of the wire extends from the fifth tooth to the sixth tooth, where the sixth tooth is located fifteen teeth from the fifth tooth.

The solid black lines shown in FIG. 5E indicate areas with the highest maximum voltage difference between adjacent coils. The wire wound around the first, second, third, fourth, fifth, and sixth teeth are represented in FIG. 5E as teeth U1-U6, respectively. The wire wound around teeth U1-U6 may represent a first phase of a five-phase motor. The second phase may be represented by teeth W1-W6, the third phase may be represented by teeth V1-V6, the fourth phase may be represented by teeth X1-X6, and the fifth phase may be represented by teeth Y1-Y6. The second, third, fourth, and fifth phases may be wound using the same winding pattern described by method 400 above.

Figure 6:
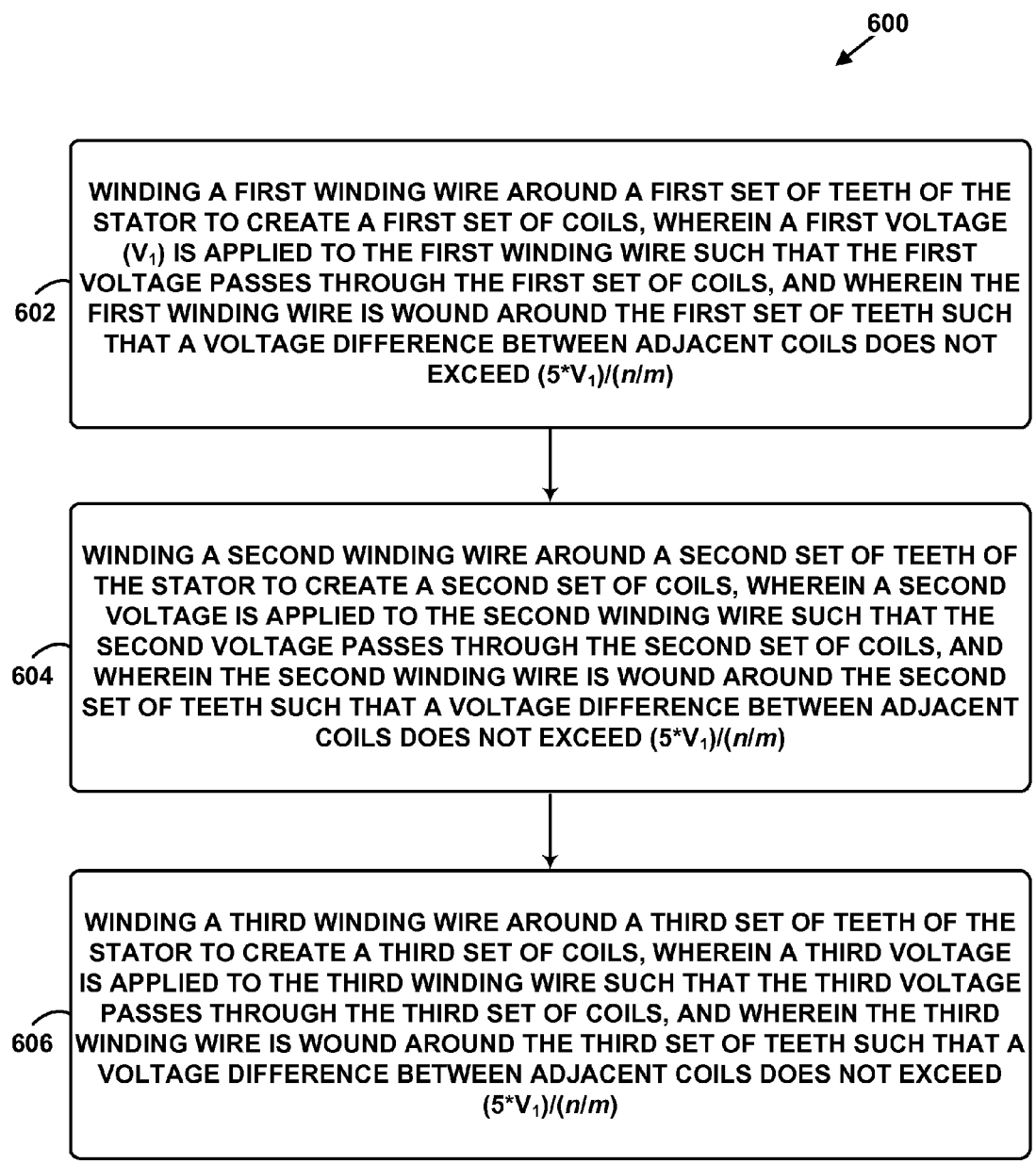
FIG. 6 is a flowchart of another method, according to an example embodiment.

FIG. 6 is a flowchart illustrating a method 600, according to an example embodiment. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Method 600 describes a method for winding a stator of a motor, wherein the stator has n teeth, and wherein the motor has m phases. In particular, at block 602, method 600 involves winding a first winding wire around a first set of teeth of the stator to create a first set of coils. A first voltage ($V_1$) may be applied to the first winding wire such that the first voltage is applied to the first set of coils. The first winding wire may be wound around the first set of teeth such that a voltage difference between adjacent coils does not exceed $$\frac{5 * V_1}{(n/m)}.$$

In one example, the first set of coils may be wound using the method 400 described above in relation to FIG. 4. However, other winding patterns are possible that achieve the same goal of limiting the voltage difference between adjacent coils to a maximum voltage difference of $$\frac{5 * V_1}{(n/m)}.$$

For example, looking to the example shown in FIG. 5A, coils U5 and U6 may be switched and the maximum voltage difference still would not exceed $$\frac{5 * V_1}{(n/m)}.$$

As another example, coils U7 and U8 may be switched and the maximum voltage difference still would not exceed $$\frac{5 * V_1}{(n/m)}.$$

Similar examples are possible with phases W and V as well.

At block 604, method 600 involves winding a second winding wire around a second set of teeth of the stator to create a second set of coils. A second voltage may be applied to the second winding wire such that the second voltage is applied to the second set of coils. In one example, the second voltage may be equivalent in magnitude to the first voltage. For example, the first voltage may be 800V, and the second voltage may be −800V. Other examples are possible as well. The second winding wire may be wound around the second set of teeth such that a voltage difference between adjacent coils does not exceed $$\frac{5*V_1}{(n/m)}.$$

In one example, the second set of coils may be wound using the method 400 described above in relation to FIG. 4. However, other winding patterns are possible that achieve the same goal of limiting the voltage difference between adjacent coils to a maximum voltage difference of $$\frac{5*V_1}{(n/m)},$$

as discussed above.

At block 606, method 600 involves winding a third winding wire around a third set of teeth of the stator to create a third set of coils. A third voltage may be applied to the third winding wire such that the third voltage is applied to the third set of coils. In one example, the third voltage may be equivalent in magnitude to the first and second voltages. The third winding wire may be wound around the third set of teeth such that a voltage difference between adjacent coils does not exceed $$\frac{5*V_1}{(n/m)}.$$

In one example, the third set of coils may be wound using the method 400 described above in relation to FIG. 4. However, other winding patterns are possible that achieve the same goal of limiting the voltage difference between adjacent coils to a maximum voltage difference of $$\frac{5*V_1}{(n/m)},$$

as discussed above.

In one example, the first winding wire wound around the first set of teeth comprises a first phase of the motor, the second winding wire wound around the second set of teeth comprises a second phase of the motor, and the third winding wire wound around the third set of teeth comprises a third phase of the motor. In such an example, the first voltage, the second voltage, and the third voltage may be constantly changing. In an example "six step" drive sequence, at time 1 the first phase may have a voltage of 800V, the second phase may have a voltage of −800V, and the third phase may have a voltage of 0V. At time 2, the first phase may have a voltage of 800V, the second phase may have a voltage of 0V, and the third phase may have a voltage of −800V. At time 3, the first phase may have a voltage of 0V, the second phase may have a voltage of 800V, and the third phase may have a voltage of −800V. At time 4, the first phase may have a voltage of −800V, the second phase may have a voltage of 800V, and the third phase may have a voltage of 0V. At time 5, the first phase may have a voltage of −800V, the second phase may have a voltage of 0V, and the third phase may have a voltage of 800V. At time 6, the first phase may have a voltage of 0V, the second phase may have a voltage of −800V, and the third phase may have a voltage of 800V. The motor may then loop back to time 1 and start the sequence over. While the voltages are constantly changing across each phase, the maximum voltage difference between adjacent coils does not exceed $$\frac{5*V_1}{(n/m)}.$$

As a specific example, FIG. 5A illustrates a 24-tooth stator for a three-phase motor. The solid black lines shown in FIG. 5A indicate areas with the highest maximum voltage difference between adjacent coils. In one example, a voltage of 800V may be applied to the series combination of U8, U7, U6, U5, U4, U3, U2, and U1, resulting in a drop of 100V across each individual coil. Similarly, a voltage of −800V may be applied to may be applied to the series combination of W8, W7, W6, W5, W4, W3, W2, and W1, resulting in a drop of −100V across each individual coil. Since FIG. 5A illustrates a 24-tooth stator for a three-phase motor, n=24 and m=3. Therefore, the maximum voltage difference between adjacent coils is $$\frac{5*800}{(24/3)} = 500 \text{ V}.$$

The winding pattern shown in FIG. 5A meets the criteria that the maximum voltage difference between adjacent coils does not exceed $$\frac{5*V_1}{(n/m)}$$

since the maximum voltage difference between U4 and W1 is 500V. Similarly, the maximum voltage difference between U2 and W3 is 500V.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A method for winding a stator of a motor, wherein the stator includes n teeth, wherein n is greater than or equal to 18, and wherein the motor has m phases, the method comprising:
   winding a wire around a first tooth of the stator;
   winding the wire around a second tooth of the stator such that a first portion of the wire extends from the first tooth to the second tooth, wherein the second tooth is $$\left(\frac{n}{2m} - 1\right)$$

teeth from the first tooth;
   winding the wire around a third tooth of the stator such that a second portion of the wire extends from the second tooth to the third tooth, wherein the third tooth is $$\left[(m-1)*\left(\frac{n}{2m}\right)\right] + 1$$

teeth from the second tooth;
   winding the wire around a fourth tooth of the stator such that a third portion of the wire extends from the third tooth to the fourth tooth, wherein the fourth tooth is $$\left(\frac{n}{2m} - 1\right)$$

teeth from the third tooth; and
   winding the wire around a fifth tooth of the stator such that a fourth portion of the wire extends from the fourth tooth to the fifth tooth, wherein the fifth tooth is $$\left[(m-1)*\left(\frac{n}{2m}\right)\right] + 2$$

teeth from the fourth tooth, wherein $$\frac{n}{2m}$$

teeth including at least the first tooth, the second tooth, and the fifth tooth are positioned on a first side of the stator, and wherein $$\frac{n}{2m}$$

teeth including at least the third tooth and the fourth tooth are positioned on a second side of the stator opposing the first side.

2. The method of claim 1, further comprising:
   winding the wire around a sixth tooth of the stator such that a fifth portion of the wire extends from the fifth tooth to the sixth tooth, wherein the sixth tooth is nine teeth from the fifth tooth.

3. The method of claim 1, further comprising:
   winding the wire around a sixth tooth of the stator such that a fifth portion of the wire extends from the fifth tooth to the sixth tooth, wherein the sixth tooth is one tooth from the fifth tooth;
   winding the wire around a seventh tooth of the stator such that a sixth portion of the wire extends from the sixth tooth to the seventh tooth, wherein the seventh tooth is eleven teeth from the sixth tooth; and
   winding the wire around an eighth tooth of the stator such that a seventh portion of the wire extends from the seventh tooth to the eighth tooth, wherein the eighth tooth is one tooth from the seventh tooth.

4. The method of claim 1, further comprising:
   winding the wire around a sixth tooth of the stator such that a fifth portion of the wire extends from the fifth tooth to the sixth tooth, wherein the sixth tooth is two teeth from the fifth tooth;
   winding the wire around a seventh tooth of the stator such that a sixth portion of the wire extends from the sixth tooth to the seventh tooth, wherein the seventh tooth is thirteen teeth from the sixth tooth;
   winding the wire around an eighth tooth of the stator such that a seventh portion of the wire extends from the seventh tooth to the eighth tooth, wherein the eighth tooth is two teeth from the seventh tooth;
   winding the wire around a ninth tooth of the stator such that an eighth portion of the wire extends from the eighth tooth to the ninth tooth, wherein the ninth tooth is fourteen teeth from the eighth tooth; and
   winding the wire around a tenth tooth of the stator such that a ninth portion of the wire extends from the ninth tooth to the tenth tooth, wherein the tenth tooth is fifteen teeth from the ninth tooth.

5. The method of claim 1, further comprising:
   winding the wire around a sixth tooth of the stator such that a fifth portion of the wire extends from the fifth tooth to the sixth tooth, wherein the sixth tooth is fifteen teeth from the fifth tooth.

6. The method of claim 1, wherein the wire wound around the first tooth, the second tooth, the third tooth, the fourth tooth, and the fifth tooth comprise a first phase of a plurality of phases, the method further comprising winding at least one additional phase of the plurality of phases in a manner similar to the first phase.

7. The method of claim 6, wherein the plurality of phases comprises three phases.

8. The method of claim 6, wherein the plurality of phases comprises five phases.

9. A motor having m phases, the motor comprising:
   a rotor;
   a stator defining n teeth, wherein n is greater than or equal to 18;
   a wire wound around a first tooth of the stator to create a first coil;
   a second coil wound around a second tooth of the stator such that a first portion of the wire extends from the first tooth to the second tooth, wherein the second tooth is $$\left(\frac{n}{2m} - 1\right)$$

teeth from the first tooth;
a third coil wound around a third tooth of the stator such that a second portion of the wire extends from the second tooth to the third tooth, wherein the third tooth is $$\left[(m-1)*\left(\frac{n}{2m}\right)\right]+1$$

teeth from the second tooth;
a fourth coil wound around a fourth tooth of the stator such that a third portion of the wire extends from the third tooth to the fourth tooth, wherein the fourth tooth is $$\left(\frac{n}{2m}-1\right)$$

teeth from the third tooth; and
a fifth coil wound around a fifth tooth of the stator such that a fourth portion of the wire extends from the fourth tooth to the fifth tooth, wherein the fifth tooth is $$\left[(m-1)*\left(\frac{n}{2m}\right)\right]+2$$

teeth from the fourth tooth, wherein n/2m teeth including at least the first tooth, the second tooth, and the fifth tooth are positioned on a first side of the stator, and wherein n/2m teeth including at least the third tooth and the fourth tooth are positioned on a second side of the stator opposing the first side.

10. The motor of claim 9, further comprising:
a sixth coil wound around a sixth tooth of the stator such that a fifth portion of the wire extends from the fifth tooth to the sixth tooth, wherein the sixth tooth is nine teeth from the fifth tooth.

11. The motor of claim 9, further comprising:
a sixth coil portion wound around a sixth tooth of the stator such that a fifth portion of the wire extends from the fifth tooth to the sixth tooth, wherein the sixth tooth is one tooth from the fifth tooth;
a seventh coil wound around a seventh tooth of the stator such that a sixth portion of the wire extends from the sixth tooth to the seventh tooth, wherein the seventh tooth is eleven teeth from the sixth tooth; and
an eighth coil wound around an eighth tooth of the stator such that a seventh portion of the wire extends from the seventh tooth to the eighth tooth, wherein the eighth tooth is one tooth from the seventh tooth.

12. The motor of claim 9, further comprising:
a sixth coil wound around a sixth tooth of the stator such that a fifth portion of the wire extends from the fifth tooth to the sixth tooth, wherein the sixth tooth is two teeth from the fifth tooth;
a seventh coil wound around a seventh tooth of the stator such that a sixth portion of the wire extends from the sixth tooth to the seventh tooth, wherein the seventh tooth is thirteen teeth from the sixth tooth;
an eighth coil wound around an eighth tooth of the stator such that a seventh portion of the wire extends from the seventh tooth to the eighth tooth, wherein the eighth tooth is two teeth from the seventh tooth;
a ninth coil wound around an ninth tooth of the stator such that an eighth portion of the wire extends from the eighth tooth to the ninth tooth, wherein the ninth tooth is fourteen teeth from the eighth tooth; and
a tenth coil wound around an tenth tooth of the stator such that a ninth portion of the wire extends from the ninth tooth to the tenth tooth, wherein the tenth tooth is fifteen teeth from the ninth tooth.

13. The motor of claim 9, further comprising:
a sixth coil wound around a sixth tooth of the stator such that a fifth portion of the wire extends from the fifth tooth to the sixth tooth, wherein the sixth tooth is fifteen teeth from the fifth tooth.

14. The motor of claim 9, wherein the wire wound around the first tooth, the second tooth, the third tooth, the fourth tooth, and the fifth tooth comprise a first phase of a plurality of phases, the method further comprising winding at least one additional phase of the plurality of phases in a manner similar to the first phase.

15. The motor of claim 14, wherein the plurality of phases comprises three phases.

16. The motor of claim 14, wherein the plurality of phases comprises five phases.

17. A method for winding a stator of a motor, wherein the stator includes n teeth, wherein n is greater than or equal to 18, and wherein the motor has m phases, the method comprising:
winding a first winding wire around a first set of teeth of the stator to create a first set of coils using the method of claim 1, wherein a first voltage ($V_1$) is applied to the first winding wire such that the first voltage is applied to the first set of coils, and wherein the first winding wire is wound around the first set of teeth such that a voltage difference between adjacent coils does not exceed $$\frac{5*V_1}{(n/m)};$$

winding a second winding wire around a second set of teeth of the stator to create a second set of coils using the method of claim 1, wherein a second voltage is applied to the second winding wire such that the second voltage is applied to the second set of coils, and wherein the second winding wire is wound around the second set of teeth such that a voltage difference between adjacent coils does not exceed $$\frac{5*V_1}{(n/m)};$$

and
winding a third winding wire around a third set of teeth of the stator to create a third set of coils using the method of claim 1, wherein a third voltage is applied to the third winding wire such that the third voltage is applied to the third set of coils, and wherein the third winding wire is wound around the third set of teeth such that a voltage difference between adjacent coils does not exceed $$\frac{5*V_1}{(n/m)}.$$

18. The method of claim 17, wherein each of the first set of coils are electrically connected in series, each of the second set of coils are electrically connected in series, and each of the third set of coils are electrically connected in series, and wherein each set of coils are evenly spaced within the stator.

19. The method of claim 17, wherein the first winding wire wound around the first set of teeth comprises a first phase of the motor, wherein the second winding wire wound around the second set of teeth comprises a second phase of the motor, and wherein the third winding wire wound around the third set of teeth comprises a third phase of the motor.

20. The method of claim 17, wherein the first voltage, the second voltage, and the third voltage are equivalent in magnitude.

* * * * *